US008887805B2

(12) United States Patent
Reyes

(10) Patent No.: US 8,887,805 B2
(45) Date of Patent: Nov. 18, 2014

(54) COMPOSITIONS AND METHODS RELATED TO MITIGATING ALUMINUM AND FERRIC PRECIPITATES IN SUBTERRANEAN FORMATIONS AFTER ACIDIZING OPERATIONS

(71) Applicant: Halliburton Energy Services, Inc., Houston, TX (US)

(72) Inventor: Enrique A. Reyes, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 151 days.

(21) Appl. No.: 13/663,825

(22) Filed: Oct. 30, 2012

(65) Prior Publication Data

US 2014/0116696 A1 May 1, 2014

(51) Int. Cl.
*E21B 43/22* (2006.01)

(52) U.S. Cl.
USPC ............ 166/279; 166/300; 166/307; 166/312

(58) Field of Classification Search
USPC .................................. 166/279, 300, 307, 312
See application file for complete search history.

(56) References Cited

U.S. PATENT DOCUMENTS

| 3,200,106 | A | * | 8/1965 | Dickson et al. ............... | 530/231 |
|---|---|---|---|---|---|
| 3,471,476 | A | | 10/1969 | Gaeumann | |
| 4,096,869 | A | | 6/1978 | Lawson | |
| 4,136,739 | A | | 1/1979 | Salathiel et al. | |
| 4,683,954 | A | | 8/1987 | Walker et al. | |
| 4,888,121 | A | | 12/1989 | Dill et al. | |
| 4,949,790 | A | | 8/1990 | Dill et al. | |
| 5,264,141 | A | | 11/1993 | Brezinski et al. | |
| 5,371,234 | A | | 12/1994 | Hancock | |
| 5,446,145 | A | | 8/1995 | Love et al. | |
| 5,622,919 | A | | 4/1997 | Brezinski et al. | |
| 5,674,817 | A | | 10/1997 | Brezinski et al. | |
| 6,225,261 | B1 | | 5/2001 | Brezinski et al. | |
| 6,315,045 | B1 | | 11/2001 | Brezinski | |
| 6,326,335 | B1 | | 12/2001 | Kowalski et al. | |
| 6,415,865 | B1 | | 7/2002 | Brezinski | |
| 6,436,880 | B1 | * | 8/2002 | Frenier .......................... | 507/244 |
| 6,534,448 | B1 | | 3/2003 | Brezinski | |
| 7,021,383 | B2 | | 4/2006 | Todd et al. | |
| 2004/0254079 | A1 | * | 12/2004 | Frenier et al. ................. | 507/260 |
| 2006/0281636 | A1 | * | 12/2006 | Smith et al. .................... | 507/277 |
| 2008/0139412 | A1 | * | 6/2008 | Fuller ............................ | 507/219 |
| 2009/0192054 | A1 | * | 7/2009 | Frenier et al. ................. | 507/205 |
| 2010/0048429 | A1 | | 2/2010 | Dobson, Jr. et al. | |
| 2011/0290482 | A1 | | 12/2011 | Weerasooriya et al. | |
| 2012/0115759 | A1 | | 5/2012 | Reyes | |

FOREIGN PATENT DOCUMENTS

| WO | 2009/137399 | A2 | 11/2009 |
|---|---|---|---|
| WO | 2010036729 | A2 | 4/2010 |
| WO | 2012127191 | A1 | 9/2012 |
| WO | 2014070599 | A1 | 5/2014 |

OTHER PUBLICATIONS

Yokel, R. A., "Aluminum Chelation Principles and Recent Advances," Coordination Chemistry Reviews 2002, 28, 113.
Schuchart, C.E.: "Chemical Study of Organic-HF Blends Leads to Improved Fluids," In SPE International Symposium on Oilfield Chemistry; Society of Petroleum Engineering; Houston, TX, 1997, vol. SPE 37281; pp. 1-4.
Dabbs, et al., "Inhibition of Aluminum Oxyhydroxide Precipitation with Citric Acid," Langmuir 2005, 21, 11690-11695.
Schuchart, et al., "Identification of Aluminum Scale with the Aid of Synthetically Produced Basic Aluminum Fluoride Complexes," Society of Petroleum Engineering, Lafayette, LA 1992, pp. 403-417.
Gama, et al., A bis(3-hydroxy-4-pyridinone)-EDTA Derivative as a Strong Chelator for M3+ Hard Metal Ions: Complexation Ability and Selectivity; Dalton Trans. 2009, 6141-6150.
BASF: Trilon M Types; In Technical Information TI/EVD 1418 e, 2007.
Biber, et al., "An In-Situ ATR-FTIR Study: The Surface Coordination of Salicylic Acid on Aluminum and Iron(III) Oxides," Environmental Science & Technology, 1994, 28, 763-768.
Neubauer, et al., "Heavy Metal Sorption on Clay Minerals Affected by the Siderophore Desferrioxamine B," Environmental Science & Technology, 1990, 34, 2749-2755.
Stone, et al., "Adsorption of Organic Compounds Possessing Ligand Donor Groups at the Oxide/Water Interface," Environmental Science & Technology, 1993, 27, 895-909.
Thomas, et al., "Aluminum(III) Speciation with Acetate and Oxalate. A Potentiometric and Aluminum-27 NMR Study," Environmental Science & Technology, 1991, 25, 1553-1559.
Yip, et al., "Kinetic Interactions of EDDS with Soils. 1. Metal Resorption and Competition Under EDDS Deficiency," Environmental Science & Technology, 1990, 43, 831-836.
Clay, et al., "The Catalytic Effect of Anions Upon the Rate of Dissolution of Hydrous Alumina by Acids," Journal of the American Chemical Society, 1938, 60, 2384-2390.
Dickie, et al., "In-Situ Infrared Spectroscopic Studies of Adsorption Processes on Boehmite Particle Films: Exchange of Surface Hydroxyl Groups Observed Upon Chelation by Acetylaxcetone," Langmuir, 2004, 20, 11630-11636.

(Continued)

*Primary Examiner* — Angela M DiTrani
*Assistant Examiner* — Silvana Runyan
(74) *Attorney, Agent, or Firm* — McDermott Will & Emery LLP; Holly Soehnge

(57) ABSTRACT

Trivalent-ion chelating agents may be useful in mitigating the formation aluminum and ferric precipitates in subterranean formations during acidizing operations. An acidizing operation may include introducing an acidizing fluid into a wellbore penetrating a subterranean formation, the acidizing fluid comprising an aqueous fluid, an acid source, and a trivalent-ion chelating agent, e.g., hydroxamates, 6,7-dihydroxyquinoline, 3-hydroxy-4-pyridinones, and any combination thereof. In some instances, trivalent-ion chelating agents with a pKa of less than about 7 may be particularly useful in acidizing operations.

20 Claims, No Drawings

(56) References Cited

OTHER PUBLICATIONS

Johnson, et al., "Adsorption of Organic Matter at Mineral Water Interfaces. 2. Outer-Sphere Adsorption of Maleate and Implications for Dissolution Processes," Langmuir 2004, 20, 4996-5006.

Johnson, et al., "Adsorption of Organic Matter at Mineral Water Interfaces: 3. Implications of Surface Dissolution for Adsorption of Oxalate," Langmuir 2004, 20, 11480-11492.

Kang, et al., "Adsorption of Dicarboxylic Acids by Clay Minerals as Examined by in Situ ATR-FTIR and ex Situ Drift," Langmuir 1990, 23, 7024-7031.

Gdanski, "Kinetics of the Secondary Reaction of HF on Alumino-Silicates," SPE International Symposium on Ollfield Chemistry; Society of Petroleum Engineering, Houston, TX, 1997, vol. SPE 37214, pp. 1-13.

Chaves et al., "Alkylaryl-Amino Derivatives of 3-Hydroxy-4-Pyridinones as Aluminum Chelating Agents with Potential Clinical Application," Journal of Inorganic Biochemistry, 97 (2003) 161-172.

International Search Report and Written Opinion for PCT/US2013/066761 dated Dec. 23, 2013.

* cited by examiner

COMPOSITIONS AND METHODS RELATED TO MITIGATING ALUMINUM AND FERRIC PRECIPITATES IN SUBTERRANEAN FORMATIONS AFTER ACIDIZING OPERATIONS

BACKGROUND

The present invention relates to compositions and methods for the mitigation of aluminum and ferric precipitates in subterranean formations during acidizing operations.

Acidizing operations may be used to cleanup a damaged wellbore or subterranean formation (e.g., removal of scale) and/or in fracturing a formation that is susceptible to dissolution by the acid. One acidizing operation, known as "matrix acidizing," comprises injecting an acidizing fluid into the formation at a pressure below the fracture gradient pressure (i.e., below the pressure sufficient to create or extend a fracture within the subterranean formation). Accordingly, in matrix acidizing, the acid source within the acidizing fluid is permitted to contact and react with the matrix of the subterranean formation so as to enhance its permeability, but the formation is not fractured. In some instances, after an acidizing treatment is completed, the water and salts dissolved therein may be recovered by producing them to the surface, e.g., "flowing back" the well, thereby leaving a desirable amount of voids within the formation, which enhances the formation's permeability and increases the rate at which hydrocarbons may subsequently be produced from the formation.

In each instance, minerals are dissolved by the acid into salts and removed from the subterranean formation, thereby enhancing permeability therethrough. However, when the concentration of salt ions in the acid is above saturation, precipitates can form that plug the voids in the subterranean formation. Therefore, acidizing operations often circulate large volumes of fluid and minimize treatment times to mitigate precipitate formation. In such acidizing operations, several treatments may be required to achieve a desired cleanup or fracturing result. Accordingly, acidizing operations are often energy intensive and costly, especially if multiple treatments are needed.

To mitigate precipitate formation and allow for longer treatment times, traditional chelating agents like ethylenediaminetetraacetic acid ("EDTA") and nitrilotriacetic acid ("NTA") has been added to acidizing fluids. These chelating agents sequester ions from the minerals and salts dissolved in the acid, thereby allowing for higher concentrations of ions to be dissolved in the acid. However, traditional chelating agents decrease efficacy as the pH increases, and in some instances, are ineffective above about pH 2.5-3. Therefore, lower pHs and stronger acids are often required for acidizing operations.

Further, in some subterranean formations, acidizing operations can produce high concentrations of trivalent ions like $Fe^{3+}$ and $Al^{3+}$, which have lower saturation points than $Ca^{2+}$, $Mg^{2+}$, $K^+$, and $Na^+$ ions. Traditional chelating agents often have higher binding energies to monovalent and divalent ions like $Ca^{2+}$, $Mg^{2+}$, $K^+$, and $Na^+$. Therefore, in the presence of a diverse ion mixture often found in the acidic dissolution of subterranean formations, monovalent and divalent ions will preferentially be sequestered by traditional chelating agents rendering them less effective to ineffective for trivalent ions. Because the saturation point for trivalent ions is often lower than monovalent and trivalent ions, trivalent ions precipitate more readily and continue to be a hindrance in developing more efficient and effective acidizing treatments.

SUMMARY OF THE INVENTION

The present invention relates to compositions and methods for the mitigation of aluminum and ferric precipitates in subterranean formations during acidizing operations.

One embodiment of the present invention provides for a method that includes introducing an acidizing fluid into a wellbore penetrating a subterranean formation, the acidizing fluid comprising an aqueous fluid, an acid source, and a trivalent-ion chelating agent.

Another embodiment of the present invention provides for a method that includes introducing an acidizing fluid into a wellbore penetrating a subterranean formation, the acidizing fluid comprising an aqueous fluid, an acid source, and a trivalent-ion chelating agent having a pKa between about 0 an about 7; and flowing back a substantial portion of the at least partially spent acidizing fluid from the subterranean formation.

Yet another embodiment of the present invention provides for an acidizing fluid that includes an aqueous fluid; an acid source; and a trivalent-ion chelating agent.

The features and advantages of the present invention will be readily apparent to those skilled in the art upon a reading of the description of the preferred embodiments that follows.

DETAILED DESCRIPTION

The present invention relates to compositions and methods for the mitigation of aluminum and ferric precipitates in subterranean formations during acidizing operations.

The compositions and methods of the present invention may, in some embodiments, utilize trivalent-ion chelating agents for sequestering or chelating to trivalent ions like $Fe^{3+}$ and $Al^{3+}$. As used herein, the term "trivalent-ion chelating agent" refers to chemicals that preferentially chelate with trivalent ions as compared to monovalent and divalent ions. For example, hydroxamates may be suitable trivalent-ion chelating agents. As used herein, the term "hydroxamates" refer to compounds that comprise at least one functional group of Formula I, and more preferably two or more functional groups of Formula I.

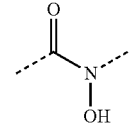

Formula I

Additionally, trivalent-ion chelating agents described herein provide a larger operating pH window than traditional chelating agents, e.g., in some instances as large as about pH 0 to about pH 10 where the efficacy from about pH 0 to about pH 5 are useful in acidizing operations.

As described further herein, the use of trivalent-ion chelating agents (optionally in combination with traditional chelating agents) in the acidizing fluids and related methods of the present invention may, in some embodiments, advantageously enable longer in-formation residence times for acidizing fluids with minimal to no precipitate formation, which, in turn, may reduce the cost, energy requirements, and time associated with acidizing operations.

In some embodiments, an acidizing fluid of the present invention may comprise an aqueous fluid, an acid source, and a trivalent-ion chelating agent. In some embodiments, the pH of the acidizing fluid may range from a lower limit of about 0, 1, 2, or 3 to an upper limit of about 7, 6, 5, 4, or 3, and wherein the pH may range from any lower limit to any upper limit and encompasses any subsets therebetween. For example, the pH of the acidizing fluid may be between about 2.5 and about 5.

Aqueous fluids suitable for use as an acidizing fluids and related methods of the present invention may, in some embodiments, include, but are not limited to, fresh water, saltwater (e.g., water containing one or more salts dissolved therein), brine (e.g., saturated salt water), seawater, and any combination thereof. Generally, the water may be from any source, provided that it does not contain components that might significantly adversely affect the stability and/or performance of the acidizing fluid or any other fluid used in conjunction with acidizing operations described herein, e.g., produced water may not be suitable as a base fluid. In some embodiments, the acidizing fluid may be foamed.

As used herein, the term "acid source" refers to a chemical or series of chemicals that are acids or acid generating compounds. Acid sources preferable for use in acidizing fluids and related methods of the present invention may include, but are not limited to, hydrofluoric acid, hydrofluoric acid generating compounds, and hydrochloric acid, and optionally further comprise acids like sulfuric acid, methanesulfonic acid, nitric acid, citric acid, lactic acid, glycolic acid, sulfamic acid, tartaric acid, acetic acid, formic acid, chloroacetic acid, dichloroacetic acid, trichloroacetic acid, and any combination thereof. Examples of suitable hydrofluoric acid generating compounds include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

Trivalent-ion chelating agents suitable for use in the acidizing fluids and related methods of the present invention may, in some embodiments, have a pKa below about 7. Trivalent-ion chelating agents suitable for use in the acidizing fluids and related methods of the present invention may, in some embodiments, have a pKa ranging from a lower limit of about 0, 1, 2, or 3 to an upper limit of about 7, 6, 5, 4, or 3, and wherein the pH may range from any lower limit to any upper limit and encompasses any subsets therebetween. For example, the pKa of a suitable trivalent-ion chelating agent may be between about 2.5 and about 5.

Trivalent-ion chelating agents suitable for use in the acidizing fluids and related methods of the present invention may, in some embodiments, be hydroxamates (e.g., monohydroxamic acids, dihydroxamic acids, trihydroxamic acids, tetrahydroxamic acids, and so on), 6,7-dihydroxyquinoline, 3-hydroxy-4-pyridinones, and the like, and any combination thereof. Examples of hydroxamates suitable for use as an acidizing fluids and related methods of the present invention may, in some embodiments, include, but are not limited to, desferioxamine, acetohydroxamic acid, and the like, any derivative thereof, and any combination thereof. Examples of 3-hydroxy-4-pyridinones suitable for use as an acidizing fluids and related methods of the present invention may, in some embodiments, include, but are not limited to, 1-(3-benzylamino-propyl)-3-hydroxy-2-methyl-1H-pyridin-4-one, 3-hydroxy-2-methyl-1-[3-(4-nitrobenzylamino)-propyl]-1H-pyridin-4-one, 3-hydroxy-2-methyl-1-[3-(4-phenyl-piperazin-1-yl)-propyl]-1H-pyridin-4-one, 1-{3-[4-(4-chlorophenyl)-piperazin-1-yl]-propyl}-3-hydroxy-2-methyl-1H-pyridin-4-one, 3-hydroxy-2-methyl-1-(3-carboxyl propyl)-1H-pyridin-4-one, and the like, any derivative thereof, and any combination thereof.

In some embodiments, the trivalent-ion chelating agent may be present in an acidizing fluid described herein in an amount ranging from a lower limit of about 1%, 3%, or 5% to an upper limit of about 40%, 30%, 15%, 10%, or 5% by weight of the acidizing fluid, and wherein the amount of trivalent-ion chelating agent may range from any lower limit to any upper limit and encompasses any subset therebetween.

In some embodiments, the trivalent-ion chelating agent described herein may be chemically bound to a polymer, thereby yielding a trivalent-ion chelating agent-derivatized polymer. For example, desferioxamine may be reacted with a polymer comprising a carboxylic group to yield a polymer with pendent desferioxamine groups. Such trivalent-ion chelating agent-derivatized polymers may increase the concentration of trivalent-ion chelating agent functionality in an acidizing fluid, thereby increasing the efficacy of the acidizing treatment and/or operation. Examples of polymers suitable for use in trivalent-ion chelating agent-derivatized polymers may include, but are not limited to, polymers that comprise monomers like acrylic acid, acrylate, and the like, and any combination thereof.

In some embodiments, the trivalent-ion chelating agent-derivatized polymers may be present in an acidizing fluid described herein in an amount ranging from a lower limit of about 0.01%, 0.1%, or 1% to an upper limit of about 5%, 3%, or 1% by weight of the acidizing fluid, and wherein the amount of trivalent-ion chelating agent-derivatized polymers may range from any lower limit to any upper limit and encompasses any subset therebetween.

In some embodiments, an acidizing fluid of the present invention may optionally further comprise a traditional chelating agent, which may be useful in chelating monovalent and divalent ions while the trivalent-ion chelating agents described herein chelate trivalent ions. Such a combination may advantageously enable longer in-formation residence times for acidizing fluids with minimal to no precipitate formation, which, in turn, may reduce the cost and time associated with acidizing operations.

Examples of traditional chelating agents suitable for use in the acidizing fluids and related methods of the present invention may, in some embodiments, include, but are not limited to, a polyhydroxycarboxylic acid, a polyaminocarboxylic acid, a phosphonate, a polymeric phosphonate, an aminopolyphosphate, an aminopolycarboxylic acid, any derivative thereof, and any combination thereof. More specific examples of traditional chelating agents suitable for use in acidizing fluids and related methods of the present invention may, in some embodiments, include, but are not limited to, ethylenediaminetetraacetic acid ("EDTA"), diethylenetriaminepentaacetic acid ("DTPA"), nitrilotriacetic acid ("NTA"), ethylenediamine-N,N'-bis(2-hydroxyphenylacetic acid) ("EDDHA"), 1,4,7,10-tetraazacyclododecane-1,4,7,10-tetraacetic acid ("DOTA"), methylglycinediacetic acid ("MGDA"), hydroxyethylethylenediaminetriacetic acid ("HEDTA"), diethylenetriaminepentaacetic acid, ethylenediaminedi(o-hydroxyphenylacetic) acid, glucoheptonic acid, gluconic acid, glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino)succinic acid, diethylenetriamine-N,N"-disuccinic acid, triethylenetetramine-N,N'''-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

In some embodiments, an acidizing fluid of the present invention may optionally further comprise an additive, e.g., salts, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents (e.g., to inhibit mineral swelling), and any combination thereof.

For example, surfactant and polymer additives may be clay-wetting surfactants and clay-wetting polymers that interact with the subterranean formation to convert a hydrophobic (or oil-wet) surface to a hydrophilic surface that is more susceptible to interaction and dissolution by the acidizing fluid.

Some embodiments of the present invention may involve introducing an acidizing fluid described herein into a wellbore penetrating a subterranean formation below the fracture gradient pressure, e.g., during a matrix acidizing operation.

Some embodiments of the present invention may optionally further involve introducing a preflush fluid into the wellbore before introduction of the acidizing fluid. Preflush fluids may be useful in treating the subterranean formation to enhance the efficacy of the subsequent acidizing fluid. For example, preflush fluids may comprise additives described herein like clay-wetting surfactants, clay-wetting polymers, and clay stabilizing agents. In another example, preflush fluids may comprise acids described herein (e.g., the same or a different acid as used in the corresponding acidizing fluid) and be used to substantially remove calcium salts from the subterranean formation.

Some embodiments of the present invention may optionally further involve introducing a displacement fluid into the wellbore after introduction of acidizing fluid. Displacement fluids, e.g., brines and aqueous fluids, may be useful in pushing the acidizing fluid further into the subterranean formation.

Some embodiments of the present invention may optionally further involve flowing back or retrieving a substantial portion of the at least partially spent acidizing fluid from the subterranean formation.

Some embodiments of the present invention may optionally further involve producing hydrocarbons from the subterranean formation.

Some embodiments of the present invention may involve introducing an acidizing fluid described herein into a wellbore penetrating a subterranean formation and optionally further involve at least one of introducing a preflush fluid, introducing a displacement fluid, flowing back the at least partially spent acidizing fluid, producing hydrocarbons from the subterranean formation, and any combination thereof.

Acidizing fluids and related methods of the present invention may be useful in conjunction with subterranean formations comprising minerals that when treated with acid yield trivalent ions like $Al^{3+}$ and $Fe^{3+}$. Examples of such minerals may include, but are not limited to, sandstone, kaolinite, diaspore, bauxite, boehmite, gibbsite, basaltic laterite, olivine, plagioclase feldspar, augite, hematite, goethite, anatase, halloysite, and any combination thereof Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
  introducing an acidizing fluid into a wellbore penetrating a subterranean formation, the acidizing fluid comprising an aqueous fluid, an acid source, and a trivalent-ion chelating agent, wherein the trivalent-ion chelatinq agent is at least one selected from the group consisting a hydroxamate, 6,7-dihydroxyquinoline, a 3-hydroxy-4-pyridinone, and any combination thereof.
2. The method of claim 1, wherein the trivalent-ion chelating agent has a pKa between about 0 and about 7.

3. The method of claim 1, wherein the trivalent-ion chelating agent has a pKa between about 0 and about 4.5.

4. The method of claim 1, wherein the pH of the acidizing fluid is between about pH 0 and about pH 7.

5. The method of claim 1, wherein the pH of the acidizing fluid is between about pH 2.5 and about pH 4.5.

6. The method of claim 1, wherein the trivalent-ion chelating agent is in an amount ranging from about 1% to about 40% by weight of the acidizing fluid.

7. The method of claim 1, wherein the trivalent-ion chelating agent is in an amount ranging from about 3% to about 15% by weight of the acidizing fluid.

8. The method of claim 1, wherein the trivalent-ion chelating agent is a trivalent-ion chelating agent-derivatized polymer.

9. The method of claim 8, wherein the trivalent-ion chelating agent-derivatized polymer is in present in the acidizing fluid in an amount ranging from about 0.01% to about 5% by weight of the acidizing fluid.

10. The method of claim 8, wherein the trivalent-ion chelating agent-derivatized polymer is in present in the acidizing fluid in an amount ranging from about 0.1% to about 1% by weight of the acidizing fluid.

11. The method of claim 1, wherein introducing the acidizing fluid is performed at a pressure below a fracture gradient pressure in the subterranean formation.

12. The method of claim 1 further comprising:
introducing a preflush fluid into the wellbore before the acidizing fluid.

13. The method of claim 1 further comprising:
introducing a displacement fluid into the wellbore after the acidizing fluid.

14. The method of claim 1 further comprising:
flowing back a substantial portion of the at least partially spent acidizing fluid from the subterranean formation.

15. The method of claim 1 further comprising:
producing hydrocarbons from the subterranean formation.

16. A method comprising:
introducing an acidizing fluid into a wellbore penetrating a subterranean formation, the acidizing fluid comprising an aqueous fluid, an acid source, and a trivalent-ion chelating agent having a pKa between about 0 an about 7, wherein the trivalent-ion chelating agent is at least one selected from the group consisting a hydroxamate, 6,7-dihydroxyquinoline, a 3-hydroxy-4-pyridinone, and any combination thereof; and
flowing back a substantial portion of the acidizing fluid from the subterranean formation.

17. The method of claim 16, wherein the trivalent-ion chelating agent is a trivalent-ion chelating agent-derivatized polymer.

18. The method of claim 17, wherein the trivalent-ion chelating agent-derivatized polymer is present in the acidizing fluid in an amount ranging from about 0.01% to about 5% by weight of the acidizing fluid.

19. The method of claim 16, wherein the trivalent-ion chelating agent is in an amount ranging from about 1% to about 40% by weight of the acidizing fluid.

20. The method of claim 16, wherein the pH of the acidizing fluid is between about pH 0 and about pH 7.

* * * * *